March 19, 1968 J. O. MELTON ET AL 3,374,016
BALL JOINT
Filed Aug. 19, 1965

INVENTORS
JAMES O. MELTON,
THOMAS B. WILKINSON &
BY JAMES H. JACKSON
Dunlap and Laney
ATTORNEYS 3,374,016
BALL JOINT
James O. Melton, Norman, and Thomas B. Wilkinson and James H. Jackson, Oklahoma City, Okla., assignors to Jamco, Inc., Oklahoma City, Okla., a corporation of Oklahoma
Filed Aug. 19, 1965, Ser. No. 481,015
15 Claims. (Cl. 287—87)

ABSTRACT OF THE DISCLOSURE

A ball joint having a spindle adapted to be connected at one end to one of two members movable relative to each other, and having a ball-receiving socket at the other end. A housing surrounds the socket and has an aperture therein accommodating the spindle. The housing is adapted for connection to the other of the two members. A ball fits in, and is engaged by, the socket, and a stud interconnects the ball with the housing at a point on the opposite side of the housing from the spindle-accommodating aperture therethrough.

---

This invention relates to an improved ball joint of the type which may be used to advantage in interconnecting two members which move relatively to each other, such as the upper and lower control arms of an automobile, and which include a metallic ball enclosed within and held by a metallic socket. More specifically, but not by way of limitation, the present invention relates to an improved ball joint especially adapted for inclusion and use in the front end steering assemblies of automobiles, the joints of this invention being unique and yielding an improved performance by reason of the provision of a ball member partially enclosed within a socket with both the socket and ball member being enclosed within a socket-like metallic housing.

A number of different types of ball and socket joints have been proposed for various uses, including use in the front end steering assembly, or front end suspension, of automobiles. The types of ball joints which have been used in automobiles have predominantly consisted of a ball member formed on a stud or spindle and encased or enclosed within a metallic socket. The socket portion of the joint is connected or attached by some suitable means to one moving member, such as a control arm in the steering assembly, and the spindle is connected to a second moving member which moves relative to the first member during the operation of the automobile.

It has been the prevalent practice in the fabrication of joints of the type described to form the metallic socket around a substantial portion of the spherical ball which is placed within the socket, and to rely almost altogether on the strength of the metal of the socket to prevent pulling out or disconnection of the ball from the socket during operation of the vehicle. Since, in many uses of joints of this type, the joint is placed under considerable tension during operation of the automobile, it is not infrequent that the socket yields and permits the ball to be pulled therefrom so that the joint is no longer effective for interconnecting the two members.

Another difficulty which has been characteristic of ball joints of the type previously used in the steering assembly of automobiles is that, after extended periods of operation of the automobile, the bearing surfaces of the ball, and of the socket with which it is in contact, become worn to the extent that a substantial amount of play develops between the ball and the socket, leading to rattling and, in some cases, actual shimmying and malfunction of the steering mechanism. This problem is compounded by the inability or inadvertent unwillingness of the operator of the automobile to provide adequate and continuing lubrication of the joint, so that wear and abrasion of the contacting bearing surfaces in the joint frequently result at an accelerated rate with increasing life of the vehicle. Attempts have been made to provide self-lubricating ball joints which contain lubricant intended to function over extended periods of time, but most of these systems still require lubrication at some time during the normal operating life of the automobile.

The present invention provides an improved ball joint which is uniquely constructed so as to eliminate or reduce significantly the undesirable characteristics which have been described in the preceding paragraphs, and which yet can be economically constructed. Broadly described, the ball joints contemplated by the invention comprise the usual spindle or stud member which is adapted to be connected to one of two members which move relatively to each other during the operation of the automobile, and a housing relatively closely approximating in its external configuration, the usual socket which is provided in joints of this type. Within the housing, however, the parts which provide positive interconnection between the relatively moving members differ substantially from the interconnecting elements of ball joints heretofore in use. Thus, on the end of the elongated spindle or stud, instead of the more conventional ball or spherical member positioned within, and gripped or engaged by, the socket, the spindle carries a hollow generally frusto-spherical, inner socket member from which a sector or segment has been cut to permit the arcuate peripheral surface of the spherical member to exceed 180°. In other words, the arc or sector of a circle which is defined in any plane passed diametrically through the inner socket member formed on the end of the spindle will include more than 180°. More specifically, this arc or circular segment will normally include an angle of more than 180°, but less than 270°.

Projecting into and gripped by a hollow frusto-spherical aperture formed within the frusto-spherical inner socket member which is disposed on the end of the spindle is a ball member which preferably is also frusto-spherical in configuration although it may be constructed as a substantially complete sphere. The ball member gripped by the frusto-spherical inner socket member is formed on the end of a relatively short shank or stud which is rigidly fixed in the base of the housing which has been hereinbefore described as having an external appearance similar to the sockets of ball joints of the type previously in use. The stud can be secured to the base of the housing in any suitable manner, such as welding or by bolting to the housing.

The internal configuration of the housing is generally frusto-spherical and is complementary in configuration to the external configuration of the inner socket formed on the end of the spindle. Thus, the housing encloses and surrounds the inner socket while permitting the spindle carrying the inner socket to project through an opening formed in the upper side of the housing or, stated differently, that side of the housing which is oppositely disposed with respect to the base carrying the stud upon which the ball is mounted.

With this arrangement, the strength of the ball joint is greatly enhanced since the spindle is retained in its proper engagement with the housing not only by the closure of the housing around the inner socket carried by the spindle, but also by the interlock of the inner socket around the ball which is itself rigidly connected to the housing. The joint can thus withstand greater loading in tension over longer periods of time and under more severe operating conditions. A much greater bearing surface is also provided when the joint is placed in tension so that greater wear and abrasion can be withstood without looseness and play being developed in the joint. The construction of the joint also permits a lubricating fluid to be sealed within the housing and in constant contact with the relatively moving bearing surfaces of the joint over its entire service life.

In one specific preferred embodiment of the invention, the ball joint is further characterized by the inclusion of a sheath surrounding, and in contact with, the frustoconical external peripheral surface of the inner socket, such sheath being constructed of high density synthetic resin having a low coefficient of friction. Positioned in bearing contact with the resin sheath is a synthetic resin liner formed on the frust-spherical inner peripheral portion of the housing, and also preferably constructed of a high density, low coefficient of friction resinous material. Since the area of contact between the resin sheath and resin liner represents the largest single bearing area within the joint, this construction has the advantage of reducing the frictional resistance to turning movement offered by the joint.

Another embodiment of the invention incorporates the concept of double articulation in the moving members of joint. In this embodiment, the frusto-spherical inner surface of the inner socket which grips and is in bearing engagement with the ball is set off center in the inner socket, and instead of being secured directly to the housing of the joint, the stud which carries this ball is pivotally connected into the base of the housing by a second ball carried at the other end of the stud. This construction allows a doubly articulated movement to occur between the two relatively moving members interconnected by the ball joint so that, within a housing of the same size as is ordinarily used, the spindle of the joint can move through a greater arc of oscillation. This doubly articulated joint also displays improved shock absorption characteristics and is excellently suited for interconnecting the tie rod ends of an automobile steering assembly.

From the foregoing description of the invention, it will have become apparent that an important object of the invention is to provide an improved ball joint which can better withstand high tensional loading and extreme operating conditions without developing excessive play, or becoming damaged.

Another object of the invention is to provide a doubly articulated ball joint which can undergo oscillating movement of greater magnitude so as to provide greater freedom of movement between two relatively moving members interconnected by the joint.

An additional object of the invention is to provide a ball joint offering reduced frictional resistance to turning of the relatively moving parts thereof.

A further object of the invention is to provide a ball joint having a lubricating fluid permanently sealed in the interior of the joint.

In addition to the foregoing described objects and advantages, additional objects will become apparent as the following detailed description of the invention is read in conjunction with the accompanying drawings which illustrate several exemplary embodiments of the invention.

Figure 1:
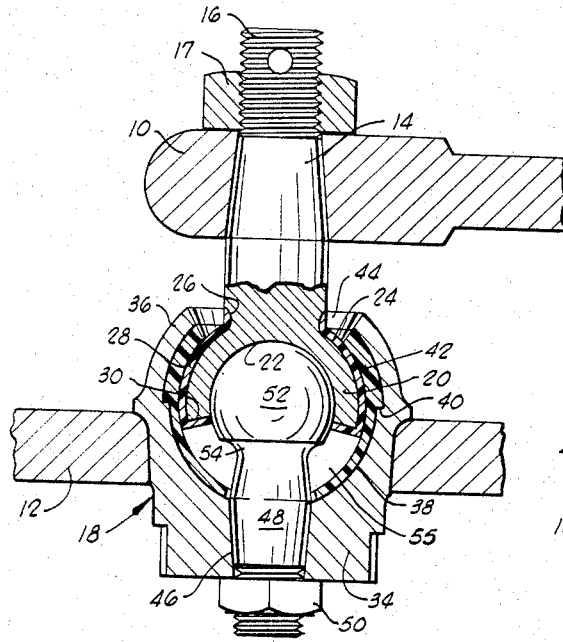
FIGURE 1 is a partial sectional view of one embodiment of the present invention illustrating the internal construction of the ball joint of the invention.

Referring to the drawings in detail, and initially to the embodiment of the invention illustrated in FIGURE 1, an upper and lower arm to be interconnected by the ball joint of the invention are designated by reference numerals 10 and 12, respectively. The upper arm is connected to an upper stud or spindle 14 which, according to conventional practice, is provided with a threated upper end 16 to receive a nut 17 when the ball joint is passed through an aperture in the upper arm 10. The lower arm 12 is pressed around and secured to a hollow metallic housing designated generally by reference character 18 and hereinafter described in greater detail.

Positioned on the lower end of the spindle 14 and formed integrally therewith is a frusto-spherical inner socket 20. It will be perceived in referring to FIGURE 1 that the frusto-spherical inner socket 20 has frusto-spherical complementary internal and external surfaces 22 and 24, respectively. The peripheral extents of the internal and external surfaces 22 and 24, respectively, of the inner socket 20 are such that these surfaces define arcs of a circle which include angles exceeding 180°, and preferably are between 180 and 270°, in any plane passed diametrically through the frusto-spherical socket. The purpose of this dimensioning of the inner socket is to permit the socket to be retained on, and engaged with, a spherical member placed inside thereof in bearing contact with the internal surface 22, as will be hereinafter explained in greater detail.

In a preferred embodiment of the invention, the spindle 14 is necked down adjacent its intersection with the socket 20 so as to form a circumferentially extending annular groove 26 which is disposed coaxially on the spindle 14. The groove 26 forms an anchor point for the base of a synthetic resin sheath 28 which is formed on and covers the outer surface 24 of the inner socket 20. The synthetic resin sheath 28 extends inwardly across the lower end 30 of the inner socket 20 to the internal surface 22 thereof. It should be noted at this point that while the synthetic resin sheath 28 is a desirable element for inclusion in the ball joint of the present invention, its use is not essential. The bearing or resistance to turning characteristic of the joint is improved by its inclusion, however, and preferred materials of construction which can be employed in the construction of the sheath 28 are high density polyethylene of the type sold under the trade name Marlex, polytetrafluoroethylene and nylon.

The housing 18 includes a base portion 34 and a socket portion 36 which encloses and surrounds the inner socket 20 of the ball joint. The housing 18 is generally cylindrical in configuration except for the socket portion 36 which is frusto-spherical in its external configuration as well as having a frusto-spherical internal chamber 38 formed therein. The upper portion of the frusto-spherical internal chamber 38 is of larger diameter than the lower portion thereof so that a circumferential lip or shoulder 40 is formed at approximately the center of the chamber. The circumferential shoulder 40 functions as an anchor point for a liner 42 of synthetic resin material having a relatively low coefficient of friction. In a preferred embodiment of the invention, the synthetic resin liner 42 is constructed of a high density synthetic resin material which has a different molecular structure from the molecular structure of the sheath 28. In referring to FIGURE 1, it will be noted that a segment of the complete spherical surface, which would be defined by the socket portion 36 of the chamber 18 if it were completely closed, has been removed so as to provide an annular space 44 surrounding the spindle 14 adjacent the annular groove 26. This space 44 permits the spindle 14 to be oscillated within the socket portion 36 of the housing 18, and thus permits the upper arm 10 to be moved relatively to the lower arm 12.

The base portion 34 of the housing 18 is provided with a centrally located aperture 46 which is disposed in coaxial alignment with the spindle 14 when the spindle is centered in the annular space 44 defined by the socket portion 36 of the housing 18. The aperture 46 is tapered from its relatively larger inner end which communicates with the frusto-spherical chamber 38 in the socket portion 36 of the chamber 18 to a smaller diameter at its outer end. A lower stud 48 is positioned in the aperture 46 and is tapered so as to exactly mate with the aperture. The outer end of the stud 48 is threaded and a locknut 50 is placed on the outer end of the stud to secure it firmly in position in the housing 18. At its end inside the frusto-spherical chamber 38, the stud 48 carries a ball or generally frusto-spherical solid metal member 52 which is dimensioned to mate with the internal surface 22 of the inner socket 20. It will be noted that the ball 52 is actually a frustum of a sphere, and that the stud 48 is necked down, or is of reduced diameter, adjacent the ball 52 as indicated by reference character 54. This permits greater freedom of oscillation of the inner socket 20 about the ball 52 as will be hereinafter explained.

In fabricating the embodiment of the ball joint illustrated in FIGURE 1, the housing 18 is initially generally cylindrical over its entire length and is thus able to receive the parts of the joint which it encloses and surrounds. Initially, the synthetic resin liner 42 is placed inside the housing 18. The liner 42 at this stage of fabrication will have a generally spherically or dome-shaped lower portion, and a cylindrical upper portion so that it is complementary in shape and conforms to the inside surface of the housing 18. At a later point in the process, the housing 18 and the synthetic resin liner 42 therein will be crimped or swaged to the configuration illustrated in FIGURE 1 to provide the final frusto-spherical configuration of the socket portion 36 of the housing.

After placing the liner 42 in the chamber 38 inside the housing 18, the combination of the spindle 14 and its integrally formed inner socket 20 with the ball 52 and lower stud 48 is formed by swaging or crimping the internal socket 20 to its frusto-spherical configuration in which it surrounds and engages the ball 52. The sheath 28 can be formed about the outer surface 24 of the inner socket 20 either before or after it has been swaged inwardly about the ball 52.

In the next step of the fabrication process, the lower stud 48 is extended through the aperture 46 in the base 34 of the housing 18, and the locknut 50 is threaded thereon to firmly secure the stud 48 and the ball 52 which it carries in a central position within the frusto-spherical chamber 38 of the housing 18. At the time of, or following, the passage of the stud 48 through the aperture 46 in the housing 18, an amount of lubricant sufficient to fill the space 55 indicated in FIGURE 1 is placed within the chamber 38 in the housing 18.

As a final step in fabricating the ball joint, the socket portion 36 of the housing 18 is crimped or swaged inwardly around the inner socket 20 into a frusto-spherical configuration as hereinbefore described. This has the effect of further locking the inner socket 20 within the housing 18 and sealing the lubricant which has been placed in the chamber in the housing 18 against loss to the outside of the housing. Crimping or swaging the upper or socket portion 36 of the housing 18 inwardly into the frusto-conical configuration illustrated in FIGURE 1 also has the effect of work hardening this portion of the housing so as to provide additional strength resisting the tendency of the inner socket 20 to be pulled out of the housing when the ball joint is placed in tension. The swaging operation also deforms the synthetic resin liner 42 to the frusto-spherical configuration in which it comes into bearing contact with the synthetic resin sheath 28 over a large area.

Operation

With the ball joint fabricated as hereinbefore described and assuming the configuration illustrated in FIGURE 1, the joint is ready for connection between two relatively moving members, such as the upper and lower arms 10 and 12 connected as depicted in FIGURE 1. In this arrangement, the arms 10 and 12 can move relatively to each other with two general types of movement. Thus, the arm 10 and the spindle 14 to which it is connected can be rotated about the longitudinal axis of the spindle, in which case the inner socket 20 pivots about the ball 52 and the synthetic resin sheath 28 slides upon the synthetic resin liner 42. A lubricant which is provided in the space 55 constantly lubricates the contacting bearing surfaces, and this lubrication continues over the entire service life of the joint.

A second type of motion which may be undergone by the members 10 and 12 is an oscillating motion in which the spindle 14 and the arm 10 which it carries are pivoted about a center of pivotation corresponding to the center of the ball 52. This oscillating movement is limited by the adjacent edges of the frusto-spherical socket portion 36 of the housing 18 and its magnitude is governed by the size of the annular space 44 which surrounds the spindle 14 adjacent the necked down portion 26.

One of the major advantages which characterize the joints of the present invention is the improved mechanical strength which resists destruction in the joint when it is placed in tension under heavy loading. The enhanced strength of the joint results from the double interlock provided by the engagement of the inner socket 20 with the ball 52, and also with the housing 18. In other words, the tendency of the inner socket 20 to be pulled out of, and completely disengaged from, the housnig 18 when the joint is placed in tension, and is subjected to severe operating conditions is opposed not only by the socket portion 36 of the housing 18, as in conventional ball joints of the type heretofore utilized in automobile steering assemblies and the like, but is also opposed by the mechanical strength of the lower stud 48 which is integrally formed with the ball 52.

Another advantage of a ball joint constructed in accordance with the present invention is the ability of the joint to resist becoming loose and developing a certain amount of play over extended periods of usage under adverse operating conditions. Thus, whereas in the case of joints of this general type as previously constructed, wear occurring between the outer surface 24 of the inner socket 20 and the inner lining of the housing 18 produces a looseness within the socket permitting lubricant contained therein to be lost, and permitting an undesirable and deleterious amount of play to be developed within the connection formed by the joint, the present invention assures much longer tightness and slack free operation of the joint because of the interlock and bearing surface formed between the internal surface 22 of the inner socket 20 with the ball 52.

Where the ball joint of the invention is used to connect two members which move relatively to each other in such a way that the joint is placed under compression, the joint offers the improvement over ball joints of the type previously in use of reducing the frictional resistance to oscillation and pivotation of the spindle 14. This is due to the fact that the bearing surfaces which are pressed against each other in the case of compressional loading of the joint are reduced in area in the joint of this invention as compared to those previously widely utilized. Thus, where the inner socket 20 and ball 52 of the present invention are both replaced by the single large ball or spherical member of ball joints as heretofore constructed, the larger ball bears against the entire frusto-spherical surface of the chamber 38 formed in the housing 18 and thus a relatively large frictional resistance to turning or oscillation of the spindle 14 occurs. In the construction of the joints according to the present invention, however, compressional loading of the joint tends to reduce the load imposed upon the sheath 28 over the surface thereof which contacts the liner 42 which lines the chamber 38 of the housing 18. Rather, increases in compressional loading of the joint are transmitted directly to the relatively small surface area of the ball 52 where it is in contact with the internal surface 22 of the inner socket 20.

Figure 2:
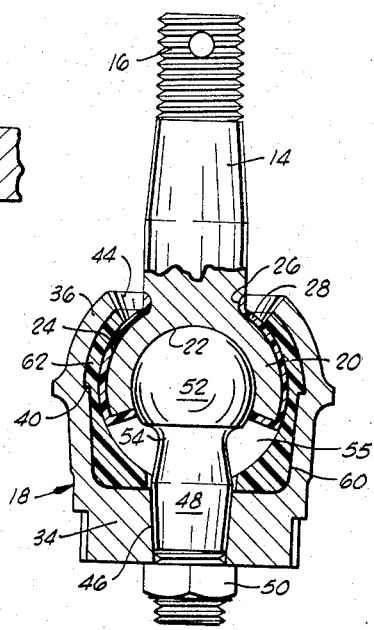
FIGURE 2 is a partial sectional view similar to FIGURE 1, but illustrating a different embodiment of the invention.

The embodiment of the invention depicted in FIGURE 2 does not differ substantially from that illustrated in FIGURE 1, and where identical structural elements have been used in the construction of this embodiment, identical reference numerals are used in the drawing. The external configuration of the housing 18 in the two embodiments is identical. However, as will be noted in referring to FIGURE 2, the chamber 60 which is formed in the housing 18 is characterized in having a generally cylindrical lower portion and the frusto-spherical upper portion. The generally cylindrical lower portion of the chamber 60 permits the liner 64 to be more easily molded to the required configuration and the thicker base portion of the liner 74 gives it greater strength and increases the service life of the joint.

Figure 3:
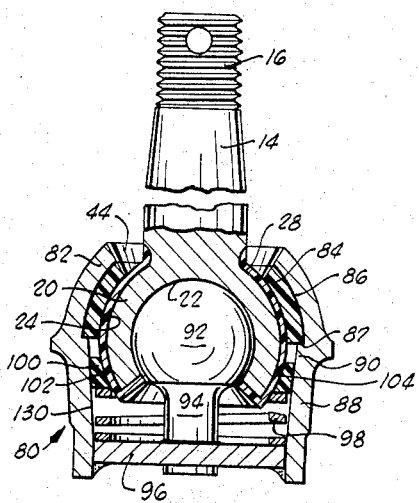
FIGURE 3 is a partial sectional view similar to FIGURES 1 and 2 are illustrating yet another embodiment of the invention.

Another modification of the invention is depicted in FIGURE 3 of the drawings. Again, identical reference numerals are utilized to identify parts of this embodiment of the invention which are identical to parts previously described in referring to FIGURES 1 and 2. The housing 80 utilized in the embodiment of FIGURE 3 is initially substantially tubular or cylindrical in configuration prior to the crimping or swaging operation which is utilized to form a frusto-spherical socket portion 82 at the upper end thereof as hereinbefore described. A partial liner 84 which is configured as a segment of a sphere is positioned in the frusto-spherical socket portion 82 of the housing 80 and bears against the internal surface 86 thereof. A shoulder 87 is formed in the housing 80 and acts as a base or anchor point for partial liner 84. The lower or base portion 88 of the housing 80 contains a tapered inner surface 90 which defines a bore of a diminishing diameter from a point adjacent the shoulder 87 to the lower end of the housing 80.

A ball member 92 is formed integrally with or firmly secured to the upper end of a lower stud 94 which is welded or otherwise suitably secured to the center of a base plate 96. The base plate 96 is screwed, welded or otherwise suitably fixed in the open lower end of the housing 80 in the illustrated position.

Positioned inside the lower portion 88 of the housing 80 and having one of its ends bearing against the base plate 96 is a helical compression spring 98. The spring 98 bears at its other end against an annular high density synthetic resin bearing washer 100 which is generally cylindrical at its outer perpheral surface 102 and is formed on a spherical figure of revolution at its inner surface 104. The bearing washer 100 is dimensioned to mate with and engage the outer frusto-spherical peripheral surface of the synthetic resin sheath 28. Preferably, the liner 84 and the bearing washer 100 are formed of synthetic resins which are molecularly dissimilar from the resin used in the fabrication of the sheath 28. The resinous materials hereinbefore described are suitable materials of construction for the synthetic resin elements used in this embodiment of the invention.

The fabrication of the embodiment of the invention illustrated in FIGURE 3 is carried out in a slightly different manner from that which has been described as characteristic of the construction of the embodiment illustrated in FIGURE 1. Thus, the bearing washer 100 and helical spring 98 are placed in position around the lower stud 94 and with the bearing washer in contact with the sheath 28 before securement of the lower stud 94 to the base plate 96. The entire assembly is then positioned within the housing 80 while it is of a generally cylindrical configuration and the base plate 96 is welded or otherwise suitably secured in the lower portion 88 of the housing 80. A final step of the process entails swaging the upper end of the housing 80 to the frusto-spherical configuration of the socket portion 82.

The embodiment of the invention illustrated in FIGURE 3 provides the advantage over the FIGURE 1 and 2 embodiments of more efficiently avoiding leakage to the outside of the housing 80 of any internal lubricant sealed in the joint around the lower stud 94. Also, the employment of the helical spring 98 in conjunction with the bearing washer 100 assures that looseness or play cannot develop internally in the socket between the external surface of the sheath 28 and the cooperating bearing elements with which it is in contact. This is because the helical spring 98 constantly biases the bearing washer 100 into bearing contact with the sheath 28, and any wear of either the sheath or the bearing washer is compensated by the continuing wedging action of the helical spring on the bearing washer.

Figure 4:
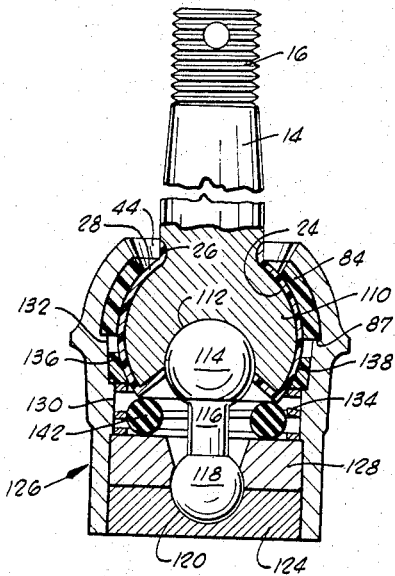
FIGURE 4 is a partial sectional view similar to FIGURES 1 and 2 and illustrating yet a further modification of the invention.

In FIGURE 4 of the drawings, a doubly articulated ball joint constructed in accordance with the broad principles of the present invention is illustrated. The inner socket 110 carried on the lower end of spindle 14 in this embodiment of the invention has an outer surface 24 shaped substantially identically to the outer surface 24 of the inner socket 20 illustrated in FIGURES 1-3. The internal surface 112 of the inner socket 110, though generally frusto-spherical in configuration, is formed eccentrically within the body of the inner socket with the center of the radius of curvature about which the surface 112 is formed being disposed below the center of the radius of curvature about which the outer surface 24 is formed.

A relatively small spherical member or ball 114 projects into and is interlocked in the inner socket 110 in a manner similar to the interlock provided in the other embodiments of the invention as previously described. It will be noted, however, in referring to FIGURE 4, that the body of the inner socket 110 can be extended further around, and more completely enclose, the ball 114. This construction is made possible by the double articulation of the joint during its movement as will be hereinafter described.

The ball 114 is connected to the upper end of, or formed integrally with, a lower stud 116 which carries at its lower end a second spherical member or ball 118. The ball 118 is received in a frusto-spherical depression 120 which is centrally formed in a base plate 124 welded or otherwise suitably secured in the open lower end of a housing designated generally by reference character 126. Positioned adjacent the base plate 124 inside the housing 126 is a relatively thick synthetic resin retaining washer 128 which surrounds and engages a portion of the ball 118 so as to retain it in the center of the base plate 124. The retaining washer 128 is maintained in its illustrated position by a plurality of circumferentially spaced, axially extending shoulders 130 formed on the inner wall 132 of the housing 126.

A helical spring 134 is positioned between the retaining washer 128 and an annular bearing washer 136 which is shaped substantially identically to the bearing washer 100 depicted in FIGURE 3 and previously described in referring thereto. The bearing washer 136 has an inner surface 138 which is formed on a segment of a sphere to mate with the external surface of the synthetic resin sheath 28. A relatively large diameter O-ring 142 constructed of a soft resilient rubber or similar material is positioned within the helical spring 134 and in contact with the bottom or lower edge of the inner socket 110 when the spindle is in its centered position as illustrated in FIGURE 4.

The doubly articulated ball joint illustrated in FIGURE 4 presents an advantage in its utilization in that the spindle 14 can oscillate to a greater degree within the housing 126 for substantially the same size of housing and annular space 44 provided in the socket portion at the upper end of the housing. Also, this embodiment of the invention can withstand an impact transmitted through the spindle 14 into the ball 114 better in instances where the spindle is angled with respect to the axis of the lower stud 116 than the embodiments of the invention previously described. This is because the lower stud 116 is movably mounted, and can yield in response to loading transmitted through the spindle to the ball 114 at an angle with respect to the axis of the lower stud 116.

From the foregoing description of the invention it will be perceived that the ball joints of the invention are improved over those previously in use in that the joints possess greater mechanical strength and are characterized by a longer trouble-free service life as a result of the reduction in the development of play or slack internally within the joint. Although certain specific characteristics and arrangements of the structural elements in several typical embodiments of the joint have been described in the application in order to provide an example for those desiring to practice the invention, many modifications and innovations may be made in the depicted structures without departure from the basic principles which underlie the invention. Insofar as these modifications and innovations do not depart from the basic principles upon which the invention is based, they are considered to be circumscribed by the spirit and scope of the invention as defined by the appended claims or reasonable equivalents thereof.

What is claimed is:

1. A ball joint comprising:
    an elongated spindle;
    a generally frusto-spherical inner socket attached to one end of said spindle and having a frusto-spherically shaped internal surface and a frusto-spherical external surface, said internal surface defining an arc of a circle of more than 180° in a plane containing the projected axis of said elongated spindle;
    a solid ball extending into, and engaged by, said inner socket, said ball being partially surrounded over more than one-half of its total external peripheral surface by the internal surface of said inner socket;
    a housing having a base portion and a frusto-spherical upper portion extending partially around, and in bearing contact with the frusto-spherical external surface of, said inner socket, said housng having a spindle receiving aperture of larger diameter than said spindle in said frusto-spherical portion; and
    stud means securing said ball to the base portion of said housing, said stud means being proportioned at its point of connection to said ball to permit said inner socket to oscillate on said ball through an arc of at least 90° to compensate for the arcuate extent of said internal surface over the ball.

2. A ball joint as claimed in claim 1 and further characterized to include:
    a synthetic resin sheath around said inner socket; and
    a synthetic resin liner lining the inside of the frusto-spherical upper portion of said housing and contacting, and in bearing engagement with, said sheath.

3. A ball joint as claimed in claim 1 wherein the internal surface of said inner socket defines an arc of between 180° and 270° with a plane containing the projected axis of said elongated spindle.

4. A ball joint as claimed in claim 1 wherein said means connecting the ball to the base portion of the housing comprises an elongated stud member having a longitudinal axis extending, when projected, through the geometric center of the aperture in the frusto-spherical upper portion of said housing.

5. A ball joint as claimed in claim 1 wherein said means connecting said ball to the base portion of said housing comprises a stud pivotally connected to said base portion at one of its ends and rigidly secured to said ball at its other end.

6. A ball joint as claimed in claim 5 wherein said stud is pivotally connected to said base portion by means of a second ball secured to said one end of said stud; and further characterized to include means retaining said second ball in a frusto-spherical depression in said base portion.

7. A ball joint as claimed in claim 1 and further characterized to include:
    a synthetic resin annular bearing washer wedged between said inner socket and said housing; and
    means resiliently biasing said bearing washer into contact with said inner socket and said housing.

8. A ball joint comprising:
    an elongated spindle;
    a generally frusto-spherical inner socket attached to one end of said spindle, and having a frusto-spherically shaped internal surface, said internal surface defining an arc of a circle of more than 180° in a plane containing the projected axis of said elongated spindle;
    a synthetic resin sheath around said inner socket adjacent the external surface thereof;
    a ball extending into, and engaged by, said inner socket, said ball being partially surrounded by the internal surface of said inner socket;
    a housing having a base portion and a frusto-spherical upper portion extending partially around, and in bearing contact with, said inner socket, said housing having a spindle-receiving aperture of larger diameter than said spindle in said frusto-spherical portion;
    a synthetic resin liner lining the inside of the frusto-spherical upper portion of said housing and contacting, and in bearing engagement with, said synthetic resin sheath; and
    means connecting said ball to the base portion of said housing.

9. A ball joint as claimed in claim 8 and further characterized to include an annular shoulder inside of, and extending around, the frusto-spherical upper portion of said housing and providing an anchor point for said synthetic resin linear.

10. A ball joint comprising:
    an elongated spindle;
    a generally frusto-spherical inner socket attached to one end of said spindle and having a frusto-spherically shaped internal surface, said internal surface defining an arc of a circle of more than 180° in a plane containing the projected axis of said elongated spindle;
    a ball extending into, and engaged by, said inner socket, said ball being partially surrounded by the internal surface of said inner socket;
    a housing having a base portion and a frusto-spherical upper portion extending partially around, and in bearing contact with, said inner socket, said housing having a spindle-receiving aperture of larger diameter than said spindle in said frusto-spherical portion;
    means connecting said ball to the base portion of said housing;
    a synthetic resin annular bearing washer wedged into engagement between said inner socket and said housing; and
    means resiliently biasing said bearing washer into contact with said inner socket and said housing.

11. A ball joint as claimed in claim 10 and further characterized to include a synthetic resin sheath around the outer peripheral surface of said inner socket and in contact with said bearing washer.

12. A ball joint comprising:
    an elongated spindle;
    a generally frusto-spherical inner socket attached to one end of said spindle and having a frusto-spherically shaped internal surface, said internal surface defining an arc of a circle of more than 180° in a plane containing the projected axis of said elongated spindle;
    a ball extending into, and engaged by, said inner socket, said ball being partially surrounded by the internal surface of said inner socket;
    a housing having a base portion and a frusto-spherical upper portion extending partially around, and in bearing contact with, said inner socket, said housing having a spindle-receiving aperture of larger diameter than said spindle in said frusto-spherical portion; and a stud pivotally connected to said base portion at one of its ends and rigidly secured to said ball at its other end.

13. A ball joint for interconnecting two members for movement relative to each other comprising:

generally cylindrical spindle means adapted to be secured to one of said members for movement therewith, said spindle means having a first end and a second end;

a ball;

socket means on one end of said spindle means and dimensioned to pivotally engage said ball by partially surrounding the outer peripheral surface of said ball;

a stud rigidly connected to said ball;

a second ball connected to the opposite end of said stud from said first mentioned ball;

housing means containing a socket pivotally surrounding said second mentioned ball, said housing means at least partially enclosing said socket means and said housing means having an aperture therethrough loosely receiving said spindle means.

14. A ball joint for interconnecting two members for movement relative to each other comprising:

generally cylindrical spindle means adapted to be secured to one of said members for movement therewith, said spindle means having a first end and a second end;

a ball;

socket means on one end of said spindle means and dimensioned to pivotally engage said ball by partially surrounding the outer peripheral surface of said ball;

a stud rigidly connected to said ball, said stud being necked down to a reduced diameter adjacent said ball, said socket means surrounding more than one-half of the total external peripheral surface of said ball whereby said socket means can oscillate on said ball with a relatively large oscillating movement while continuously positively engaging said ball; and housing means connected to said stud and at least partially enclosing said socket means, said housing means having an aperture therethrough loosely receiving said spindle means.

15. A ball joint as claimed in claim 11 and further characterized to include a synthetic resin liner lining a portion of the inside of the frusto-spherical upper portion of said housing and contacting said sheath.

References Cited

UNITED STATES PATENTS

| | | | |
|---|---|---|---|
| 1,959,563 | 5/1934 | Baker | 287—90 |
| 2,365,067 | 12/1944 | Gauld | 287—21 X |
| 2,614,862 | 10/1952 | Alldredge et al. | 287—87 X |
| 2,841,428 | 7/1952 | Moskovitz | 287—90 |
| 2,885,248 | 5/1959 | White | 287—90 |
| 3,053,556 | 9/1962 | Klocke et al. | 287—87 |
| 3,103,377 | 9/1963 | Scheublein | 287—90 |
| 3,135,540 | 6/1964 | Herbenar | 287—87 |

CARL W. TOMLIN, *Primary Examiner.*

ANDREW KUNDRAT, *Assistant Examiner.*